(12) United States Patent
Olsen et al.

(10) Patent No.: US 6,804,317 B2
(45) Date of Patent: Oct. 12, 2004

(54) DIGITAL FRAME DETERMINATION METHOD AND APPARATUS

(75) Inventors: Ronald D. Olsen, Lake View, NY (US); Michael E. Rupp, Amherst, NY (US); Jon C. Melnik, Alden, NY (US)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 10/040,689

(22) Filed: Jan. 4, 2002

(65) Prior Publication Data

US 2003/0128788 A1 Jul. 10, 2003

(51) Int. Cl.⁷ ................................................ H04L 7/00
(52) U.S. Cl. ...................................................... 375/368
(58) Field of Search ................................ 370/304, 324, 370/350, 395.62, 395.63, 503, 506; 375/354, 355, 356, 357, 358, 359, 360, 361, 362, 363, 364, 365, 366, 367, 368, 369, 370, 371, 372, 373, 374, 375, 376, 377

(56) References Cited

U.S. PATENT DOCUMENTS

| | | | |
|---|---|---|---|
| 4,878,229 A | 10/1989 | Szechenyi | |
| 5,956,324 A | 9/1999 | Engdahl et al. | |
| 6,298,387 B1 | 10/2001 | Prasad et al. | |
| 2002/0122435 A1 * | 9/2002 | Mundkur et al. | ........... 370/503 |

* cited by examiner

*Primary Examiner*—Stephen Chin
*Assistant Examiner*—Guillermo Muñoz
(74) *Attorney, Agent, or Firm*—Blakely, Sokoloff, Taylor & Zafman LLP

(57) ABSTRACT

A digital frame determination method and apparatus are provided which collect a data frame from a digital data stream starting at an initial frame start and a nominal frame frequency, test the data frame for alignment based on a set of rules, determine an adjustment value in accordance with the set of rules when the data frame is not aligned, adjust the frame start in accordance with the adjustment value, and repeat until the data frame is aligned and the alignment is verified.

15 Claims, 6 Drawing Sheets

200
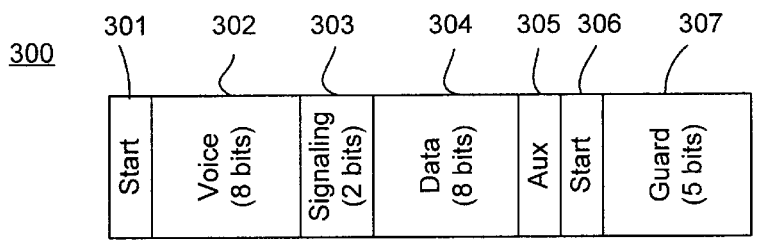
FIG. 2
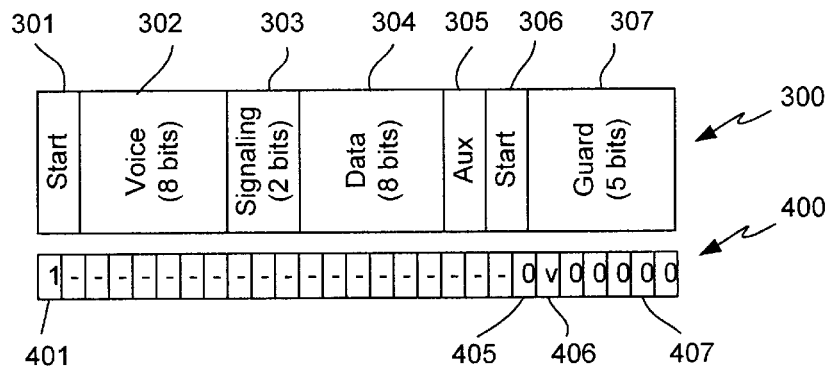
FIG. 3
FIG. 4 though some components and functions may be described as being hardware or software, as is well understood by those in the art, which components and functions are implemented in hardware and which are implemented in software may vary depending on many factors, such as the speed of the pro-

DIGITAL FRAME DETERMINATION METHOD AND APPARATUS

TECHNICAL FIELD

The present invention relates to the field of digital telephony. In particular, the present invention relates to accessing the data stream between a digital telephone and the switch.

BACKGROUND

In the world of digital telephones there are many different service providers. Each provider has a proprietary method for encoding the communication stream that runs between the telephone and the switch or PBX (private branch exchange). Most communications between the digital phone and the switch work by sending signals having different waveforms of data between the phone and the switch, typically on a two-wire pair, with the data digitally encoded in the signal.

It is common in digital phone systems for the information to be transmitted between the switch and phone using a framing scheme or protocol. Typically, frames are transmitted on 125 microsecond intervals. The format of the frames varies from protocol to protocol but the format of every frame in a protocol is the same. For example one telephony protocol may dictate that the format of its data frames contain a start bit, eight bits of voice data, two bits of control data, two bits of secondary voice data, and a parity bit. Each data frame transmitted using that particular protocol will have that format. Another protocol may require a format for its data frames containing, for example, a start bit, sixteen bits of voice data, two signaling bits, eight data bits, an auxiliary bit, and a stop bit. Each data frame in a particular proprietary data stream will have the format required by the protocol for that data stream. Depending on the protocol there will typically be from 20 to 100 bits of information in each telephony data frame.

There are certain products available that are connected on the telephone line between the telephone and the switch. For example, a digital telephone may be connected to a personal computer (PC) that is connected to the telephone line. The PC is situated on the telephone line between the telephone and the switch. The PC can be used to place phone calls, answer the phone, voice mail, or fax. In order to do these things, the PC must emulate the communication protocol between the telephone and the switch.

Devices, such as the PC example above, that passively tap the switch/phone line must reliably create a signal that demarcates the start of each frame. One of the key elements in implementing a telephony protocol stack is frame synchronization, i.e., locking the hardware to the frame frequency and phasing. Once this has been accomplished, the task of extracting and regenerating the telephony information becomes possible.

In the prior art, frame synchronization relies on protocol specific hardware implementations. The implementation of a new protocol requires a new hardware design and the integration of the hardware into existing systems. It often takes months to design and implement the new hardware; thus the need to change the hardware design for each telephony protocol is an expensive and time-consuming problem.

BRIEF DESCRIPTION OF THE DRAWINGS

The present invention is illustrated by way of example, and not necessarily by way of limitation, in the figures of the accompanying drawings in which like reference numerals refer to similar elements, and in which:

FIG. 2 is a diagram of a sample data stream by which certain aspects of the present invention may be illustrated;

FIG. 3 is a diagram of an example of the format of a data frame by which certain aspects of the present invention may be illustrated;

FIG. 4 is a diagram of an example of a set of rules for a data frame by which certain aspects of the present invention may be illustrated;

DETAILED DESCRIPTION

Figure 1:
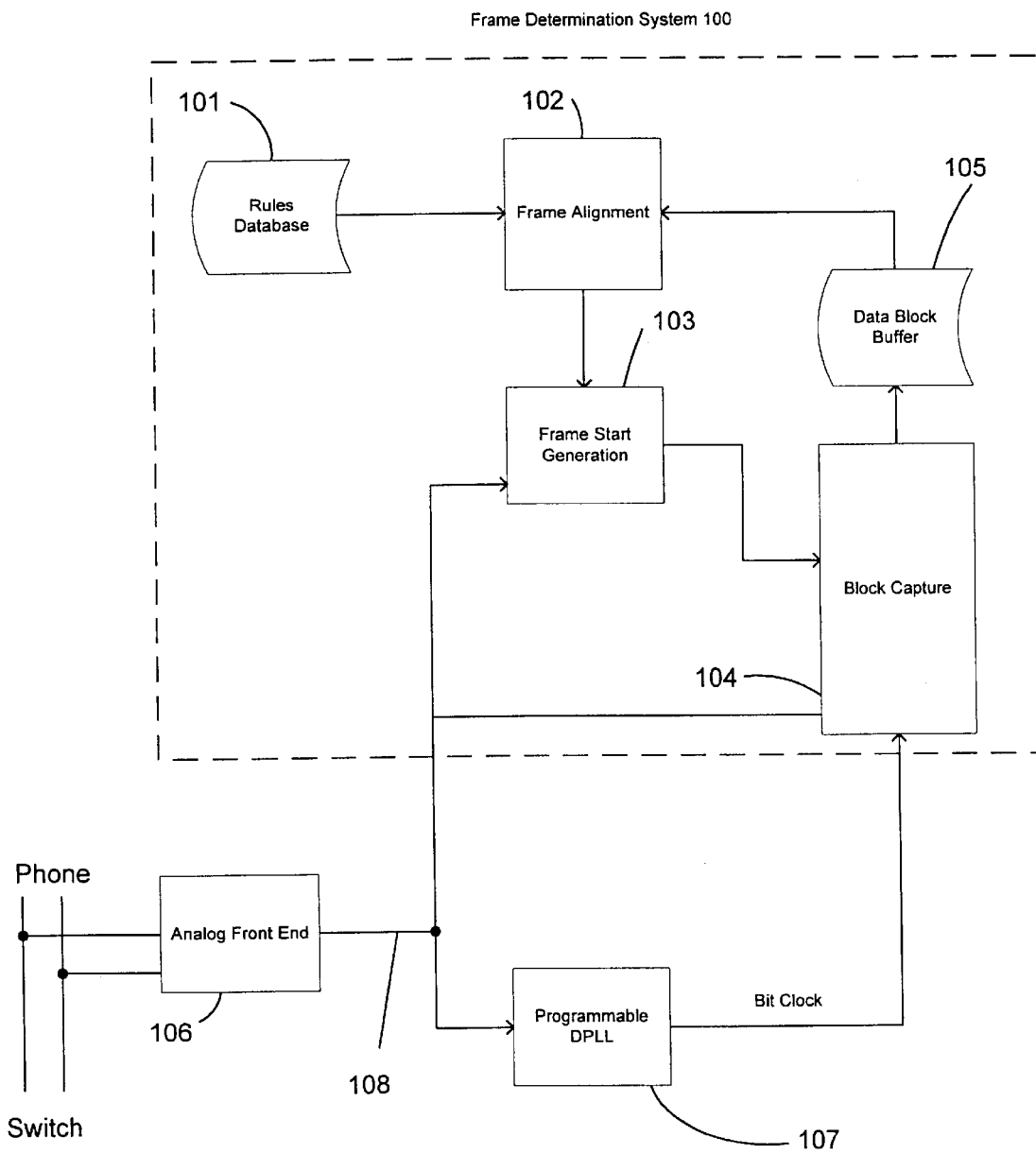
FIG. 1 is a block diagram illustrating one embodiment of the present invention.

In the following description, various aspects of the present invention, a method and apparatus for automatically determining the frame boundaries in a digital data stream, are described. Specific details are set forth in order to provide a thorough understanding of the present invention. However, it is understood by those skilled in the art that the present invention may be practiced with only some or all aspects of the present invention, and with or without some or all of the specific details. In some instances, well-known features may be omitted or simplified in order not to obscure the present invention.

Parts of the description are presented in terms of operations performed by a computer system, using terms such as data, flags, bits, values, characters, strings, numbers and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

The present invention is described in components for ease in illustrating the embodiment. The invention may or may not actually be implemented in discrete components, and such components may or may not correspond to the components used in this description. Also, even though some components and functions may be described as being hardware or software, as is well understood by those in the art, which components and functions are implemented in hardware and which are implemented in software may vary depending on many factors, such as the speed of the processor or processors involved, among others, and these variations in implementation are well within the scope of the present invention. Also, the use of the term "hardware" is intended to include the term "logic" meaning Boolean logic as implemented in, for example, a Field Programmable Gate Array (FPGA) or Application Specific Integrated Circuit (ASIC).

Various operations are described as multiple discrete steps performed in turn in a manner that is most helpful in understanding the present invention. However, the order of description should not be construed to imply that these operations are necessarily performed in the order they are presented, or even order dependent. Lastly, repeated usage of the phrase "in one embodiment" does not necessarily refer to the same embodiment, although it may.

In one embodiment, the present invention includes a combination of hardware and software that provides the determination of a digital telephony frame start and the phase locking of the hardware to the frame. In the embodiment, the invention allows for support of different telephony protocols without needing to change the hardware by incorporating a rules-based algorithm for frame start determination. Although the applied rules change with changes in the protocols, the structure of the frame determination system remains constant.

FIG. 1 is a block diagram illustrating one embodiment of the present invention. The frame determination system 100 consists of three subcomponents: the frame alignment component (FAC) 102, the frame start generation component (FSGC) 103, and the block capture component (BCC) 104. In the embodiment, the FAC 102 is implemented in software and the FSGC 103 and BCC 104 are implemented in Boolean logic. The frame determination system 100 further comprises a rules database 101, which contains the protocol-specific rules for determining the frame start, and a data block buffer 105, in which the BCC 104 stores the data block.

In one embodiment, the rules database 101 contains at least the nominal frame frequency, that is, the interval between frame repetitions in the data stream 108. Typically, the nominal frame frequency is 125 microseconds for a frame with 8 bits of voice data or 250 microseconds for a frame with 16 bits of voice data but the invention is not limited to these frequencies. The rules database 101 also contains the rules for the format of the data frame and the required values of certain bits in the data frame, i.e., a bit pattern. It may also contain the number of times a frame capture must pass the rules check to satisfy the alignment requirement, among other things.

In one embodiment, the FAC 102 accesses the rules database 101, checks the data frames and calculates the adjustments to the frame start. The FSGC 103 generates the frame start signals and performs the adjustments to align the frame. The BCC 104 takes a "snapshot" of the data, that is, it places a block of data in the data buffer 105 for use by the FAC 102. The Analog Front End 106 and the Programmable DPLL 107 may be used in the process of getting the data block from the PBX/phone line, but they are not part of the present invention and they will not be further discussed except as they may be used by the present invention. The Programmable DPLL 107 may be a programmable digital phased lock loop such as the one described in co-pending U.S. patent application Ser. No. 09/750,671, "Programmable Digital Phase Lock Loop" assigned to Intel Corporation of Santa Clara, Calif., the assignee of the present invention.

FIG. 2 is a diagram of a sample data block by which certain aspects of the present invention may be illustrated. The block of data 200 represents multiple frames of information between the phone and switch and is typically 256 bits of data; however, this amount could vary depending on the embodiment. The sample data block 200 represents an input to the frame determination system 100. In the example, the data block 200 is a series of bits each with a value of "1", "0", or "V." For the purposes of this example, "1" represents a logical one, "0" represents a logical zero, and "V" represents a logical one with a code violation. It is understood by those skilled in the art that each bit can have multiple states or values and, therefore, how this occurs will not be further discussed except as it pertains to the invention.

FIG. 3 is a diagram of an example of the format of a data frame by which certain aspects of the present invention may be illustrated. For the purposes of this example, the data frame 300 consists of 26 bits formatted as follows: 1 start bit 301, 8 voice bits 302, 2 signaling bit 303, 8 data bits 304, 1 auxiliary bit 305, 1 stop bit 306, and 5 guard bits 307. The data block 200 consists of a succession of data frames 300. The format is the same for each data frame within a specific data stream 108. The nominal frame frequency of the example data frame 300 is 26 bits. This example data frame 300 is used in the following explanation of the present invention.

FIG. 4 is a diagram of an example of a set of rules for a data frame by which certain aspects of the present invention may be illustrated. FIG. 4 shows the example data frame format 300 with an example set of rules 400 representing the required value for each bit. These formats 300 and rules 400 are stored in the rules database 101. The FAC 102 determines the alignment of the data frame by applying the set of rules 400 defining specific values for certain bits in the data frame. The illustrated set of rules 400 requires the value of the start bit 301 to be "1" 401, the value of the auxiliary bit 305 to be "0" 405, the value of the stop bit 306 to be "V" 406, and the value of the guard bits 307 to be "0" 407. These values are for illustration only and may or may not be values actually assigned by any telephony protocol.

Referring again to FIG. 1, in one embodiment of the present invention, the FAC 102 configures the FSGC 103 with the nominal frame frequency and the FSGC 103 makes an initial guess at the frame start. The initial guess may be made arbitrarily or may be based on an algorithm or rule included in the rules database 101. For example, the rules database 101 may contain a rule requiring that the start bit 301 always have a value of "1" and the FSGC 103 may make the initial guess by counting x number of zeroes, where the value of x is also stored in the rules database 101, and then choosing the next "1" as the frame start bit. The accuracy of the initial guess is not important since the frame determination system 100 is robust enough to converge even on the worst possible guess.

In the illustrated embodiment, at the initiation of the FSGC 103, the BCC 104 captures a block of data 200 and places it in the buffer 105. The FAC 102 applies a rules-checking algorithm to the block of data 200 and refines the frame start position. The FSGC 103 continues to create the frame start signal at the nominal frame frequency until instructed by the FAC 102 to adjust the frame start. The FSGC 103 may instruct the FAC 102 to adjust the frame start by increasing the nominal frame frequency by one bit or by decreasing the nominal frame frequency by one bit repetitively until the data frame is aligned. Alternatively, the FSGC 103 may estimate the total number of bits to adjust the nominal frame frequency by applying the rules in the rules database 101 and instruct the FAC 102 to make a single adjustment to align the data frame.

Figure 5:
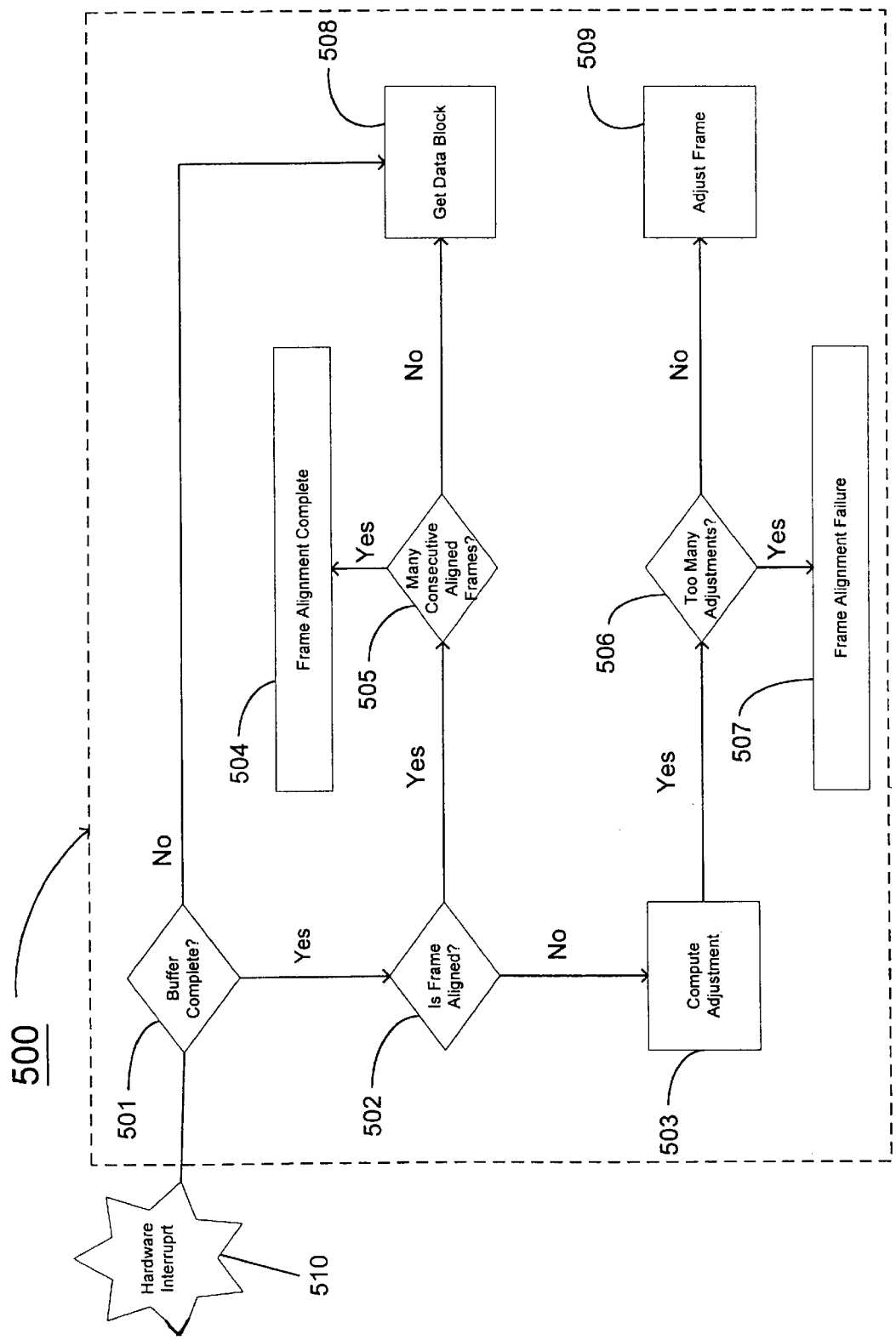
FIG. 5 is a flow diagram illustrating a method to be performed by a computer executing one embodiment of the illustrated invention.

FIG. 5 is a flow diagram illustrating a method to be performed by a computer executing one embodiment of the illustrated invention. Certain aspects of the methods of the invention are described in terms of computer software with reference to the flowchart in FIG. 5. The methods to be performed by a computer constitute computer programs made up of computer-executable instructions. Describing the methods by reference to a flowchart enables one skilled in the art to develop such programs including such instructions to carry out the methods on suitably configured computers (the processor or processors of the computer executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems or without an operating system.

In addition, the present invention is not described with reference to any particular programming language. It is appreciated that a variety of programming languages may be used to implement the teachings of the invention as described herein. Furthermore, it is common in the art to speak of software, in one form or another (e.g., program, procedure, process, application), as taking an action or causing a result. Such expressions are merely a shorthand way of saying that execution of the software by a computer causes the processor or processors of the computer to perform an action or to produce a result.

FIG. 5 illustrates one embodiment of the frame determination function. A hardware interrupt 510 can occur for two reasons: 1) the data block buffer 105 is complete or 2) the adjustment to the frame start is completed. The FAC 102 determines 501 why the hardware interrupted. If the data block buffer 105 is complete, the FAC 102 reads the data block from the data block buffer 105 and applies the set of rules to the data block to determine if the frame start is correctly aligned 502. If the frame start is aligned and it has been aligned for multiple iterations 505, then the frame alignment is completed 504. If the number of consecutive frames aligned is not sufficient to validate the frame alignment 505, the FAC 102 requests another block of data 508.

In the illustrated embodiment, if the frame is not aligned 502, the FAC 102 computes an adjustment value 503 and tests to see how many adjustments have already been made 506. If there have been multiple adjustments to the frame start signal and the frame alignment still cannot be verified, an alignment failure 507 occurs. If the number of frame start adjustments does not exceed the maximum allowable value 506 (provided in the rules database 101), then the FAC 102 instructs the FSGC 103 to make the adjustment 509.

In the illustrated embodiment, the hardware also interrupts 510 when the FSGC 103 completes an adjustment. If, after the hardware interrupt 510, the FAC 102 determines that the data block buffer 105 is not complete, the FAC 102 requests a new block of data 508.

Figure 6:
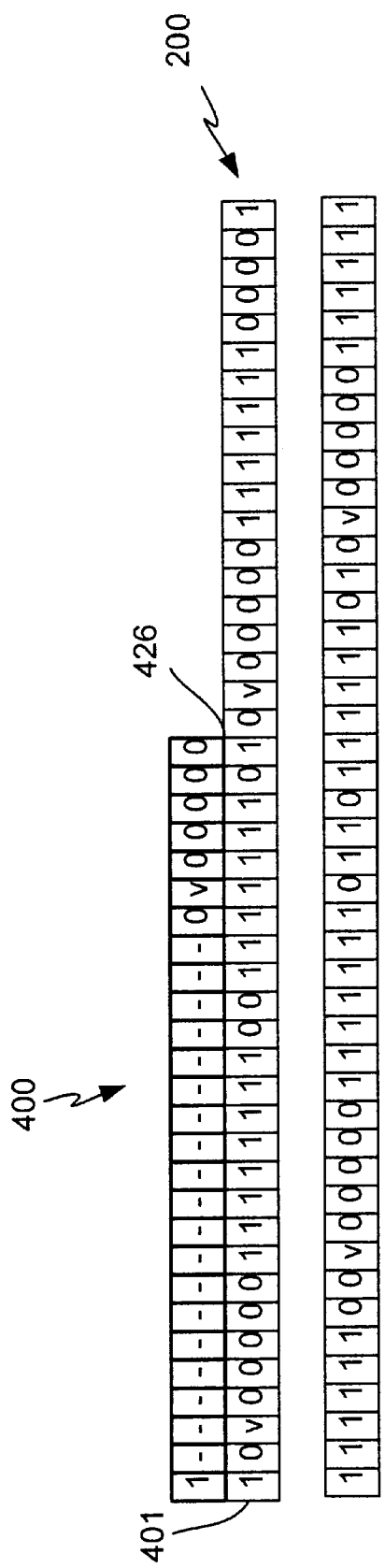
FIG. 6 is a diagram of an example of applying a set of rules to a data block by which certain aspects of the present invention may be illustrated.
Figure 7:
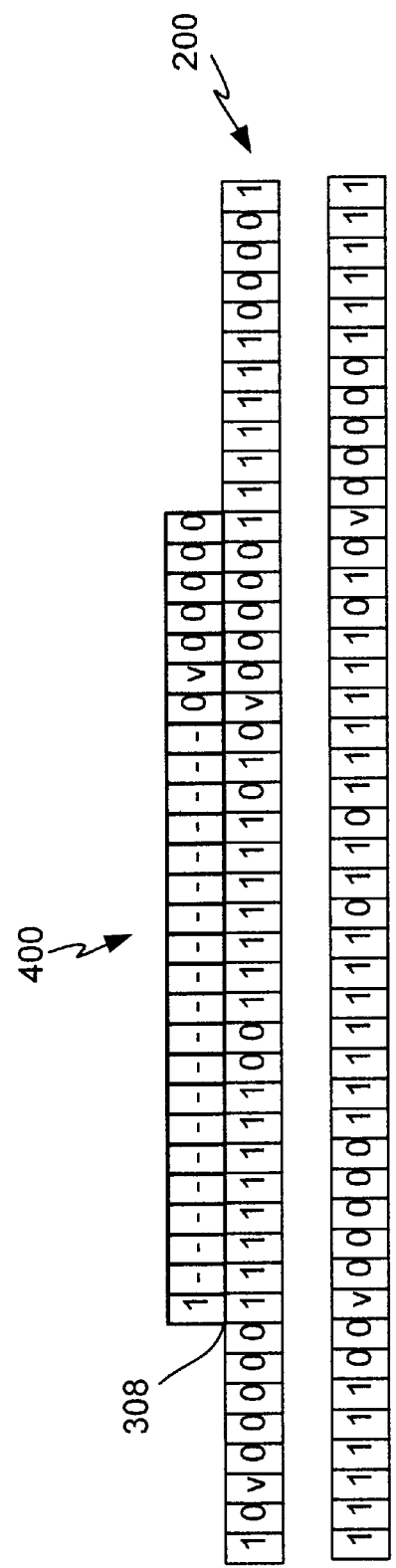
FIG. 7 is diagram of reapplying the set of rules to the data block in the example in FIG. 6 after shifting the frame start by which certain aspects of the present invention may be illustrated.

FIG. 6 is a diagram of an example of applying a set of rules to a data block by which certain aspects of the present invention may be illustrated. FIG. 6 shows the application of the set of rules 400 to the data block 200 at the start of the initial frame alignment attempt 502. Some of the values of the bits in the data block 200 match the requirements of the set of rules 400 (i.e., both bit 201 and bit 226 have a "0" value as required by the set of rules 400) but the other bits do not. For the purposes of this example, the data frame is not aligned properly. In this situation, in one embodiment, the FAC 102 calculates a frame adjustment FIG. 7 is diagram of another step in the example in FIG. 6 by which certain aspects of the present invention may be illustrated. Eventually, by shifting the frame start and applying the rules 400 to different starting points in the data block 200, the frame determination process 500 finds a data frame that aligns with the set of rules 400 as illustrated in the example alignment shown in FIG. 7. Each bit in the set of rules 400 aligns exactly with a bit in the data frame which starts with bit 208 in data block 200. When the frame determination process 500 finds a data frame that aligns with the set of rules 400, it shifts the frame start a full frame, captures another frame of data and repeats the comparison to verify that the alignment is correct. In the example illustrated in FIG. 7, the frame start would be shifted 26 bits which is the length of the data frame. The verification must be successful x number of times (where the value of x is provided by the rules database) in order for verification to be complete.

Figure 8:
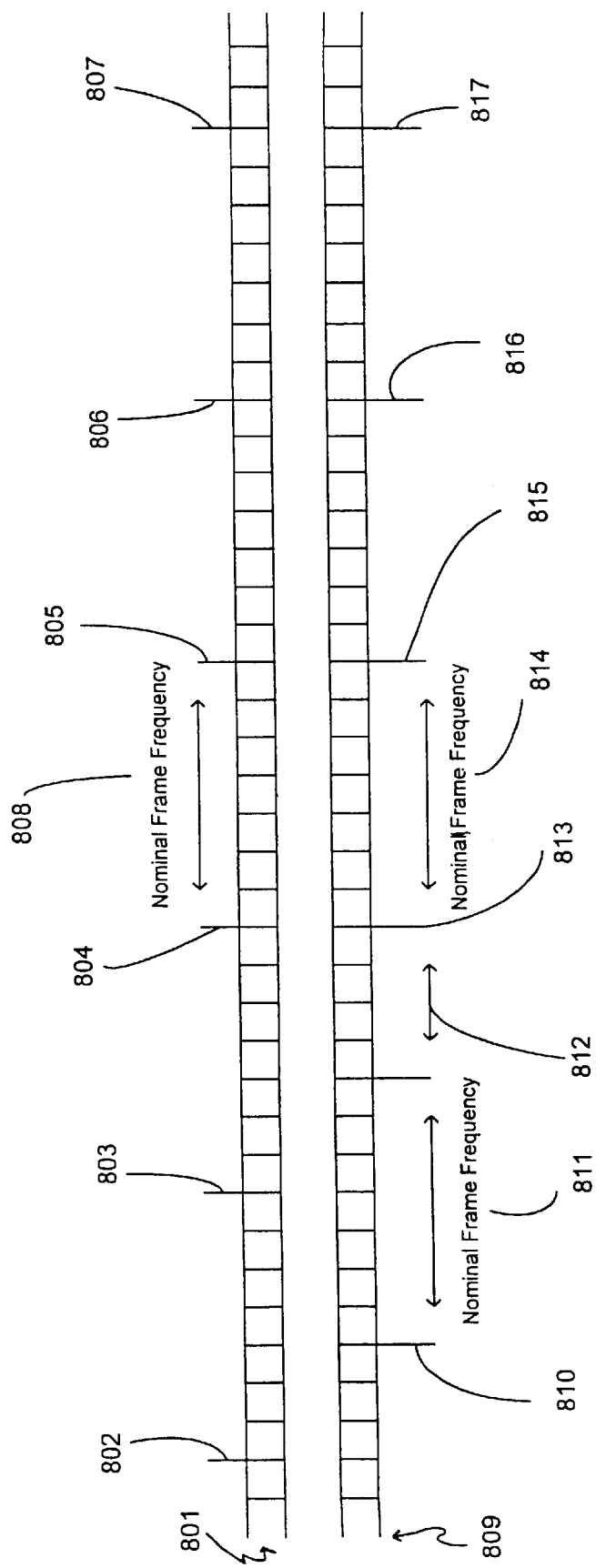
FIG. 8 is a diagram of another sample data stream and a sample data block by which certain aspects of the present invention may be illustrated.

FIG. 8 is a diagram of another sample data stream and a sample data block by which certain aspects of the present invention may be illustrated. Data block 801 is a section of a sample data stream 108. For the purposes of this example, the frame starts 802–807 in the data block 801 occur every 7 seconds which is the nominal frame frequency 808 in the example. Data block 809 is a section of a sample data block that illustrates a block of data captured by the BCC 104. When the FAC 102 asks for a block of data, it gives the FSGC 103 the nominal frame frequency 808 from the rules database 101. The FSGC 103 guesses at the initial frame start, which for the purposes of this example is an arbitrary guess at initial frame start 810. In the example, the initial frame start 810 is not aligned, i.e., frame start 810 is not aligned with frame start 802 or frame start 803. The FAC 102 checks the alignment of the data frame 811, as described above with reference to FIG. 5, and instructs the FSGC 103 to adjust the frame start either positively or negatively in time. The FSGC 103 makes the adjustment 812 by creating one frame start 813 either sooner or later than the nominal frame frequency 808 in order to align the frame start 813 with the actual frame start. After the single adjustment 812 the FSGC 103 returns to using the nominal frame frequency 814.

The procedure of capturing a block of data and adjusting the frame start continues until the FAC 102 is satisfied that the frame start is positioned correctly, i.e., every bit in the frame corresponds to the values required by the rules database 101. When the FAC 102 is satisfied that the frame start is positioned correctly, the alignment process described above is verified, that is, repeated enough times to give confidence that the alignment is correct. The number of repetitions needed to give confidence in the alignment varies depending on the protocol. Thereafter, the FSGC 103 is responsible for generating the repetitive frame start signal 815–817 that is locked to the switch/phone line.

Figure 9:
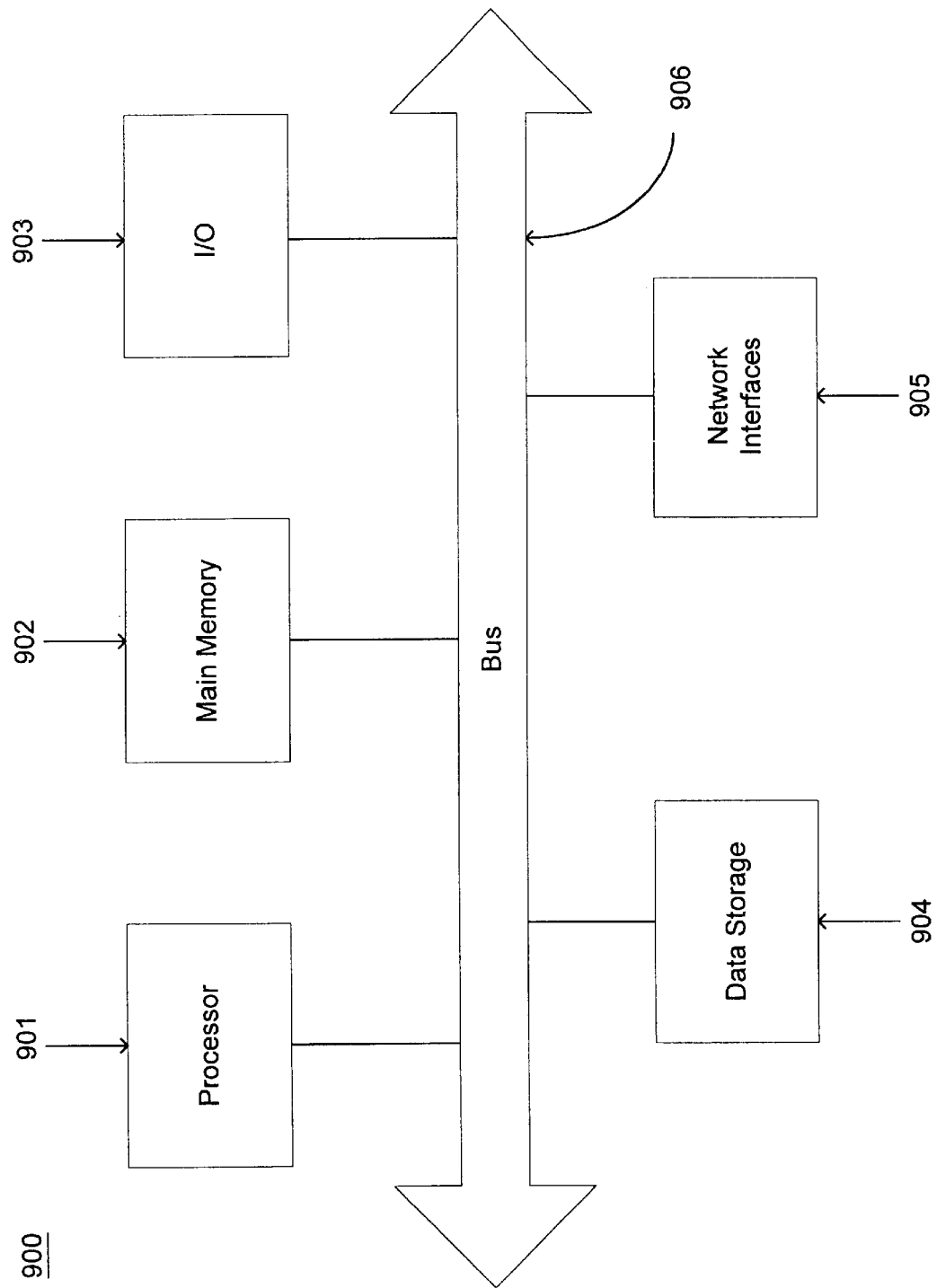
FIG. 9 is an illustration of a generalized computing device suitable for use with one embodiment of the present invention.

FIG. 9 is an illustration of a generalized computing device suitable for use with one embodiment of the present invention. As illustrated, the frame determination functions of the present invention may be implemented on a computer system 900. Computer system 900 includes processor system 901, input/output (I/O) devices 903, data storage 904, and network interfaces 905 coupled to each other via a bus 906. Additionally, main memory 902, which can include one or more of cache memories, system memory (RAM), and nonvolatile storage devices (e.g., magnetic or optical disks) is also coupled to the bus for storage of instructions and data for use by processor system 901. I/O devices 903 represent a broad range of input and output devices, including keyboards, cursor control devices (e.g., a trackpad or mouse), etc.

It is to be appreciated that various components of computer system 900 may be rearranged, and that certain implementations of the present invention may not require nor include all of the above components. Additionally, multiple buses (e.g., a standard I/O bus and a high performance I/O bus) may be included in computer system 900. Furthermore, additional components may be included in system 900, such as additional processors, storage devices, memories, network/communication interfaces, etc.

In the illustrated embodiment of FIG. 9, the method and apparatus for frame determination according to the present invention as discussed above is partly implemented as a series of software routines run by computer system 900 of FIG. 9. These software routines comprise a series of instructions to be executed by a processing system in a hardware system, such as processor system 901 of FIG. 9. Initially, the series of instructions are stored on a storage device of main memory 902. It is to be appreciated that the series of instructions can be stored in data storage 904 using any conventional computer-readable or machine-accessible storage medium, such as a diskette, DC-ROM, magnetic tape, DVD, ROM, Flash memory, etc. It is also to be appreciated that the series of instructions need not be stored locally, and could be stored on a propagated data signal received from a remote storage device, such as a server on a network, via a network/communication interface. The instructions are copied from the storage device 904, such as mass storage, or from the propagated signal into main memory 902 and then accessed and executed by a processor or processors 901. It is to be appreciated that these software routines may be implemented in any of a wide variety of programming languages.

In alternate embodiments, the present invention is implemented in discrete hardware or firmware and could be implemented in one or more ASICs of an additional circuit board for insertion into computer system 900 of FIG. 9. In yet another embodiment, the present invention is implemented entirely in software routines executed by a high-speed processor or processors 901 in a system such as computer system 900.

Thus, the present invention is not limited by the details described. Instead, the present invention can be practiced with modifications and alterations within the spirit and scope of the appended claims.

What is claimed is:

1. A method comprising:
   collecting a first data frame from a data stream starting at an initial frame start and a nominal frame frequency;
   testing the first data frame for alignment based on a set of rules, the rules including a frame format and a nominal frame frequency;
   determining an adjustment value in accordance with the set of rules when the first data frame is not aligned;
   adjusting the frame start in accordance with the adjustment value, including adjusting the nominal frame frequency for a single frame by creating a frame start signal to indicate a start of a frame sooner or later in time than a frame start would be expected according to the nominal frame frequency; and
   collecting a second data frame from the data stream starting at the adjusted frame start until the data frame is aligned.

2. The method of claim 1 further comprising verifying that the data frame is aligned wherein verifying comprises determining at least one time that the data frame is aligned without requiring any adjustments.

3. The method of claim 1 wherein the data stream is a stream of digital telephony data and the set of rules corresponds to an expected protocol specific to the data stream.

4. The method of claim 1 wherein testing the data frame for alignment based on a set of rules comprises:
   comparing each bit of the data frame with a corresponding required value in the set of rules; and
   determining that the data frame is aligned if the bits in the data frame match the corresponding required values in the set of rules.

5. The method of claim 1 wherein determining an adjustment value comprises making an estimate of a correct frame start by comparing the data frame to the set of rules.

6. The method of claim 1 wherein adjusting the frame start comprises increasing the nominal frame frequency by one bit for a single frame.

7. The method of claim 1 wherein adjusting the frame start comprises decreasing the nominal frame frequency by one bit for a single frame.

8. An apparatus to lock a digital data frame in a telephony data stream comprising:
   a frame start generator to generate a frame start at a nominal frame frequency, the frame start indicating a location in a telephony data stream where a digital data frame might start, the nominal frame frequency indicating the length of the digital data frame, the frame start generator to adjust the nominal frame frequency for one frame by creating a frame start signal sooner or later in time than a frame start would be expected according to the nominal frame frequency;
   a block capture component to capture a block of the telephony data stream beginning at the frame start and in synchronization with the nominal frame frequency;
   a rules database comprising a set of rules corresponding to the telephony data stream and the nominal frame frequency having, the rules including a frame format and a nominal frequency; and
   a frame alignment component to determine whether the digital data frame is aligned, wherein the frame start generator adjusts the frame start after each capture in response to an adjustment input from the frame alignment component until the frame start coincides with the location in the telephony data stream where the digital data frame actually starts.

9. The apparatus of claim 8 wherein the frame start generator adjusts the nominal frame frequency by increasing the nominal frame frequency for one frame.

10. The apparatus of claim 8 wherein the frame start generator adjusts the nominal frame frequency by decreasing the nominal frame frequency for one frame.

11. An article of manufacture comprising a machine-accessible medium having content to provide instructions to cause a machine to:
   collect a first data frame from a data stream starting at an initial frame start and a nominal frame frequency;
   test the first data frame for alignment based on a set of rules, the rules including a frame format and a nominal frame frequency;
   determine an adjustment value in accordance with the set of rules when the first data frame is not aligned;
   adjust the frame start in accordance with the adjustment value, including adjusting the nominal frame frequency for a single frame by creating a frame start signal to indicate a start of a frame sooner or later in time than a frame start would be expected according to the nominal frame frequency; and collect a second data frame from the data stream starting at the adjusted frame start until the data frame is aligned.

12. The article of manufacture of claim 11 wherein the content to provide instructions to cause the machine to test the data frame for alignment based on a set of rules comprises the content to provide instructions to cause the machine to:

compare each bit of the data frame with a corresponding required value in the set of rules; and determine that the data frame is aligned if the bits in the data frame match the corresponding required values in the set of rules.

13. The article of manufacture of claim 11 wherein the content to provide instructions to cause the machine to determine an adjustment value comprises the content to provide instructions to cause the machine to make an estimate of a correct frame start by comparing the data frame to the set of rules.

14. The article of manufacture of claim 11 wherein the content to provide instructions to cause the machine to adjust the frame start comprises the content to provide instructions to cause the machine to increase the nominal frame frequency by one bit for a single frame.

15. The article of manufacture of claim 11 wherein the content to provide instructions to cause the machine to adjust the frame start comprises the content to provide instructions to cause the machine to decrease the nominal frame frequency by one bit for a single frame.

* * * * *